United States Patent
Leung et al.

(10) Patent No.: US 8,122,323 B2
(45) Date of Patent: Feb. 21, 2012

(54) METHOD, APPARATUS, AND SYSTEM FOR DYNAMIC ECC CODE RATE ADJUSTMENT

(75) Inventors: Peter Leung, Port Coquitlam (CA); Chun Fung Man, Vancouver (CA); Chong Ong, Richmond (CA)

(73) Assignee: Intel Corporation, Santa Clara, CA (US)

( * ) Notice: Subject to any disclaimer, the term of this patent is extended or adjusted under 35 U.S.C. 154(b) by 1384 days.

(21) Appl. No.: 11/683,631

(22) Filed: Mar. 8, 2007

(65) Prior Publication Data

US 2008/0222490 A1    Sep. 11, 2008

(51) Int. Cl.
*H03M 13/00* (2006.01)

(52) U.S. Cl. .................. 714/774; 714/763; 714/720

(58) Field of Classification Search .......... 714/774, 714/763, 720, 764, 704
See application file for complete search history.

(56) References Cited

U.S. PATENT DOCUMENTS

| | | | |
|---|---|---|---|
| 6,477,669 B1 | 11/2002 | Agarwal et al. | |
| 6,631,488 B1 * | 10/2003 | Stambaugh et al. | 714/746 |
| 6,904,548 B2 * | 6/2005 | Hashida et al. | 714/704 |
| 6,961,890 B2 | 11/2005 | Smith | |
| 6,996,766 B2 * | 2/2006 | Cypher | 714/764 |
| 7,353,438 B2 * | 4/2008 | Leung et al. | 714/720 |
| 2003/0037299 A1 * | 2/2003 | Smith | 714/763 |
| 2005/0172179 A1 | 8/2005 | Brandenberger et al. | |
| 2006/0104372 A1 * | 5/2006 | Coene et al. | 375/260 |

FOREIGN PATENT DOCUMENTS

EP    1175034    1/2002

OTHER PUBLICATIONS

Bauer, M. et al., "A multilevel-cell 32 Mb flash memory," Digest of Technical Papers of the 1995 IEEE International Solid-States Circuits Conference, pp. 132-133.
Baumann, R., "The impact of technology scaling on soft error rate performance and limits to the efficacy of error correction," Digest of the International Electron Devices Meeting 2002, pp. 329-332.
Lin, S. et al., Error Control Coding: Fundamentals and Applications, 2nd Edition. Upper Saddle River, NJ: Pearson Prentice Hall, 2004. (pp. 1-5, 194-195, 205-209, 237-239.
Modelli, A. et al., "Advanced Flash Memory Reliability," International Conference on Integrated Circuit Design and Technology, 2004, pp. 211-218.
Tanzawa, T. et al., "A compact on-chip ECC for low cost flash memories," IEEE Journal of Solid State Circuits, vol. 32, issue 5, pp. 662-669, May 1997.
Korean Patent Office, International Search Report and Written Opinion for PCT Application No. PCT/US2008/055763, 11 pages, Jul. 28, 2008.

* cited by examiner

*Primary Examiner* — Fritz Alphonse
(74) *Attorney, Agent, or Firm* — Trop, Pruner & Hu, P.C.

(57) ABSTRACT

A method, apparatus, and system for dynamic adjustment of an error control coding (ECC) code rate are disclosed. In one embodiment, a code rate may be changed from a first code rate to a second code rate in response to a change in a bit error rate.

14 Claims, 5 Drawing Sheets

METHOD, APPARATUS, AND SYSTEM FOR DYNAMIC ECC CODE RATE ADJUSTMENT

BACKGROUND

The ability of a memory device to store and accurately retain data is important. Bit errors which compromise the integrity of the stored data become increasingly problematic as memory devices continue to become smaller with the scaling of process technology. Bit errors may also be problematic in Multi Level Cell (MLC) memories where more than one bit is stored in a single memory cell.

The bit error rate (BER) for a memory device is non-static, and can change over time as the memory is used and as the ability of the memory cells to retain charge decreases.

BRIEF DESCRIPTION OF THE DRAWINGS

A better understanding of embodiments of the present invention can be obtained from the following detailed description in conjunction with the following drawings, in which.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Various embodiments of the invention may be implemented in one or any combination of hardware, firmware, and software. The invention may also be implemented as instructions contained in or on a machine-readable medium, which may be read and executed by one or more processors to enable performance of the operations described herein. A machine-readable medium may include any mechanism for storing, transmitting, and/or receiving information in a form readable by a machine (e.g., a computer). For example, a machine-readable medium may include a storage medium, such as but not limited to read only memory (ROM); random access memory (RAM); magnetic disk storage media; optical storage media; a flash memory device, etc. A machine-readable medium may also include a propagated signal which has been modulated to encode the instructions, such as but not limited to electromagnetic, optical, or acoustical carrier wave signals.

The term "wireless" and its derivatives may be used to describe circuits, devices, systems, methods, techniques, communications channels, etc., that communicate data by using modulated electromagnetic radiation through a non-solid medium. The term does not imply that the associated devices do not contain any wires, although in some embodiments they might not. The term "mobile wireless device" is used to describe a wireless device that may be in motion while it is communicating.

Figure 1:
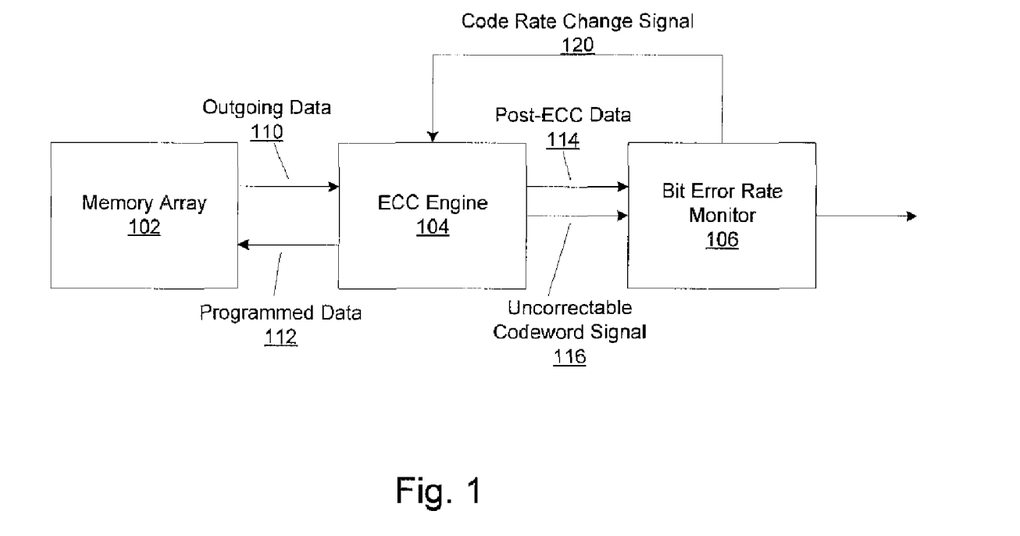
FIG. 1 is a block diagram illustrating an apparatus for performing error correction according to some embodiments.

FIG. 1 is a block diagram illustrating an error correction apparatus according to some embodiments. The error correction apparatus includes a memory array (102), an error control coding (ECC) engine (104) coupled to the memory array (102), and a bit error rate monitor (106) coupled to the ECC engine (104). In some embodiments, the memory array (102), the ECC engine (104), and the bit error rate monitor (106) may be located on a single die, such as, for example, on a memory device. In other embodiments, these components may be on separate die in a single package. In yet other embodiments, the memory array may be part of a memory device, while the ECC engine and bit error rate monitor are part of a memory controller device that is separate from the memory device. Other configurations may also be possible.

The memory array (102) may be an array of memory cells, such as, for example, non-volatile flash memory cells. In some embodiments, the non-volatile memory cells may be capable of storing more than one bit per cell. For example, the memory cells may be multi-level flash memory cells (MLC) capable of storing two or more bits per cell. In some embodiments, the array may be an array of NAND flash memory cells. However, it should be understood that embodiments may be applicable to other types of memory as well, including, but not limited to, NOR flash memory, phase change memory, or any other type of memory suitable for deploying error correction using ECC.

The memory array stores information data as well as ECC parity data. This data may be stored in the form of a codeword that contains both information and parity data. As used herein, data that is read from the memory array (102) is referred to as outgoing data (110). Data that is written to the memory array (102) is referred to as programmed data (112).

When data is written to the memory array, the ECC engine (104) computes the parity data and forms codewords including both information and parity data before writing the data as a codeword to the memory array. The ECC engine also performs error correction on outgoing data that was previously programmed as a codeword.

The ECC engine (104) may use one of a number of error control codes to form codewords and to perform error correction. For example, the FCC engine may use BCH code or Reed-Solomon code, or may use another error control code.

Generally for a class of block codes, for a range of code rates (i.e., the ratio of the number of information bits, k, to the total number of bits, n, in the codeword), the ECC engine (104) can correct up to a predetermined number of errors, t. For a codeword containing t or less errors, the errors will be corrected by the ECC engine (104), and post-ECC data (114) will be generated. Post-ECC data (114) may include information and parity bits, as well as error information. For a correctable codeword, the post-ECC information and parity bits will be error free, and information regarding the number of errors corrected, if any, will be generated by the ECC engine (104). For example, in BCH code, determining the number of errors corrected is equivalent to the order of the error locator polynomial. The number of errors corrected in each codeword may be used by the bit error monitor (106) to estimate the bit error rate.

If a codeword includes more than t errors, the codeword cannot be corrected, and the ECC engine (104) will send an uncorrectable codeword signal (116) to the bit error rate monitor (106). For an uncorrectable codeword, the information and parity bits will include at least one error. The ECC engine will not be able to provide the exact number of errors corrected, but this number will be assumed to be greater than t.

In some embodiments, the code rate of the ECC engine (104) may be changed by increasing or decreasing the length of a codeword. For example, a codeword may be shortened from (n) to (n−l), where l is the reduction in the number of bits per codeword. By shorting the codeword by l bits, the code rate changes from (k/n) to (k−l)/(n−l). Thus, the code rate of the ECC engine may be changed without modifying the encoding or decoding capabilities of the ECC engine.

The bit error rate monitor (106) dynamically determines a bit error rate based at least in part on the uncorrectable codeword signals received from the ECC engine (104). If the bit error rate deviates from a desired bit error rate by a predefined threshold value, the bit error monitor (106) sends a signal (120) to the ECC engine indicating that the code rate must be adjusted. Both the desired bit error rate and the predefined threshold value may be user configurable values.

If the bit error rate determined by the bit error rate monitor is greater than the desired bit error rate by a predefined threshold, the code rate change signal (120) will indicate that the code rate of the ECC engine should be decreased. If the bit error rate determined by the bit error rate monitor is less than the desired bit error rate by a predefined threshold, the code rate change signal (120) will indicate that the code rate of the ECC engine should be increased.

The code rate may be changed by changing various parameters of the ECC engine, including, but not limited to, changing the codeword length or the changing the number of maximum corrections. In some embodiments, the code rate of the ECC engine may be dynamically changed from a first code rate to a second code rate by changing the codeword length in response to a change in the bit error rate as determined by the bit error monitor.

In some embodiments, the bit error rate monitor (106) determines an outgoing error rate. The outgoing error rate is defined as the reciprocal of the average number of bits read before an uncorrectable codeword is encountered. The average number of bits read before an uncorrectable codeword is encountered may be calculated over a predefined parameter. For example, the outgoing error rate (ER) may be estimated using the following calculation, where $B_i$ is the number of bits read before encountering the next uncorrectable codeword:

$$\text{outgoing } ER = j/\Sigma_{i=1}^{j} Bi$$

In this calculation, j is a number of samples taken, and may be adjusted in order to change the level of sensitivity to the code rate. If it is undesirable to change the code rate too frequently, then j can be made large. Likewise, if it is desirable to adjust the code rate quickly to achieve the desired outgoing error rate sooner, than j should be small. In some embodiments, the values of $B_i$ may be stored using counters. For example, at an outgoing error rate of $10^{-12}$, $B_i$ will fit into a 40 bit counter. In other embodiments, the reciprocal of the outgoing error rate may be calculated and used to trigger a code rate change. In this case, the calculation may be implemented as a sum of right shifted $B_i$ values if j is chosen to be a power of two.

In other embodiments, the bit error rate monitor (106) may determine an incoming bit error rate. The incoming bit error rate may be calculated as follows:

$$\text{incoming } BER = (T_b + T_c(t+1))/(j(n-l)).$$

In the equation above, $T_b$ is the total number of bit errors for all codewords having less than t bit errors, $T_c$ is the total number of uncorrectable codewords in the j codewords read, t is the maximum number of bit errors in the codeword that may be corrected using ECC, and (n−l) is the total number of bits in a codeword. In the case of an unshortened codeword, l is zero.

The incoming bit error rate may be used to trigger a change in code rate (120). Based on the incoming bit error rate, the outgoing error rate may be estimated based on a binomial distribution for a random bit error rate. Alternatively, the incoming bit error rate to outgoing error rate mapping may be implemented using a look up table. In practice, the number of code rates used may be small (e.g., less than 10), therefore, the look up table will be small in size.

Upon receiving a code rate change signal (120) from the bit error monitor (106), the ECC engine (104) may have to reprogram codewords that are programmed in the memory array (102). This operation may require the codewords to be read out and re-encoded using the new code rate before they are reprogrammed to the memory array. This process may be done during one or more idle periods. Interrupts to this process may be handled via state machines and systematic tracking of reprogrammed blocks within the memory array.

Table 1, below, illustrates how a memory array may be reconfigured for various codeword sizes, depending on the error rate of the memory device. The overall capacity of the memory device may be reduced while the acceptable raw bit error rate increases.

TABLE 1

| Bit error rate level | Information bits per codeword | Parity per codeword | Codeword size | Information bits per 524 B | Capacity | Code rate | Incoming BER to maintain 1E−15 output error rate |
|---|---|---|---|---|---|---|---|
| 1 | 512 B | 12 B | 524 B | 512 B | 100% | 97.7% | 3.4E−5 |
| 2 | 250 B | 12 B | 262 B | 500 B | 97.7% | 95.45 | 6.3E−5 |
| 3 | 119 B | 12 B | 131 B | 476 B | 93.0% | 90.8% | 11.6E−5 |

Initially, data may be read and written using bit error rate level 1. When the detected error rate approaches 3.4e-5, the device may attempt to change codeword sizes and operate at bit error level 2. New data will be written using a smaller codeword to provide stronger error correction. Old data that was previously stored in memory will be updated to use the smaller codeword. This update may be performed as a background task. An indicator may be stored with the data to indicate at which level the data was coded. If a predetermined percentage of the device is full (e.g., 97.7% or greater), the bit error rate level will not be changed, due to lack of free space. When the detected error rate approaches 6.3e-5, the device may switch to operate at bit error level 3 in a manner similar to that described above.

Figure 2:
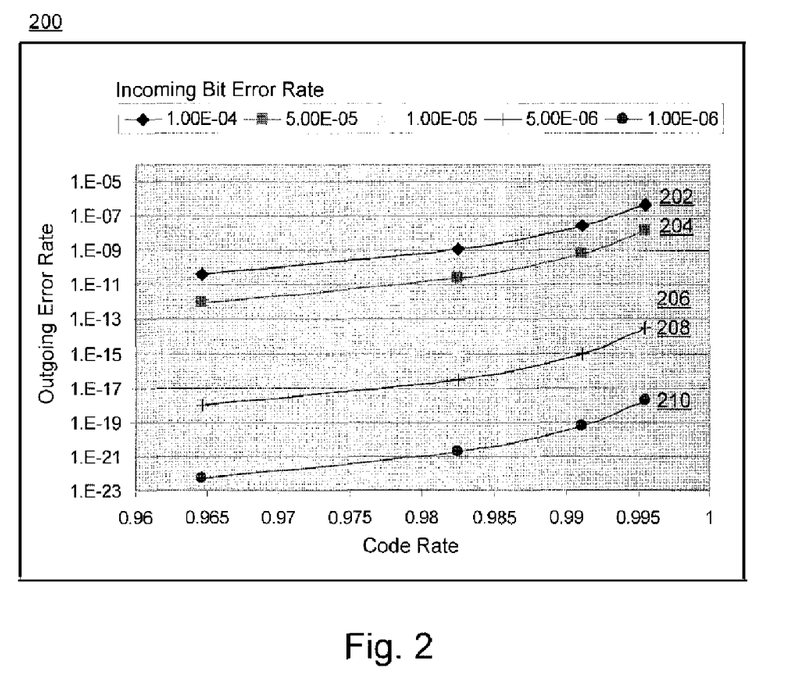
FIG. 2 is a graph illustrating outgoing error rate versus code rate for a memory device.

FIG. 2 is a graph (200) that illustrates the outgoing error rate as a function of code rate at various incoming bit error rates (202, 204, 206, 208, 210) for n=32767, k=32692, and t=5. The graph illustrates that the outgoing error rate is lower for lower code rates. This is because for a fixed incoming bit error rate, the probability of having a codeword with more than t errors is less when the codeword size is smaller. Thus, with a fixed encoding and decoding circuit it is possible to adjust the outgoing error rate for a fixed incoming bit error rate by dynamically changing the code rate, as described above with respect to FIG. 1.

The graph (200) also illustrates that if the incoming bit error rate changes, the outgoing error rate may still be maintained by changing the code rate. For example, if the incoming bit error rate increases from 5E-06 (208) to 1E-05 (206), the outgoing error rate may be maintained at 1E-13 by reducing the code rate from 0.995 to 0.990.

Figure 3:
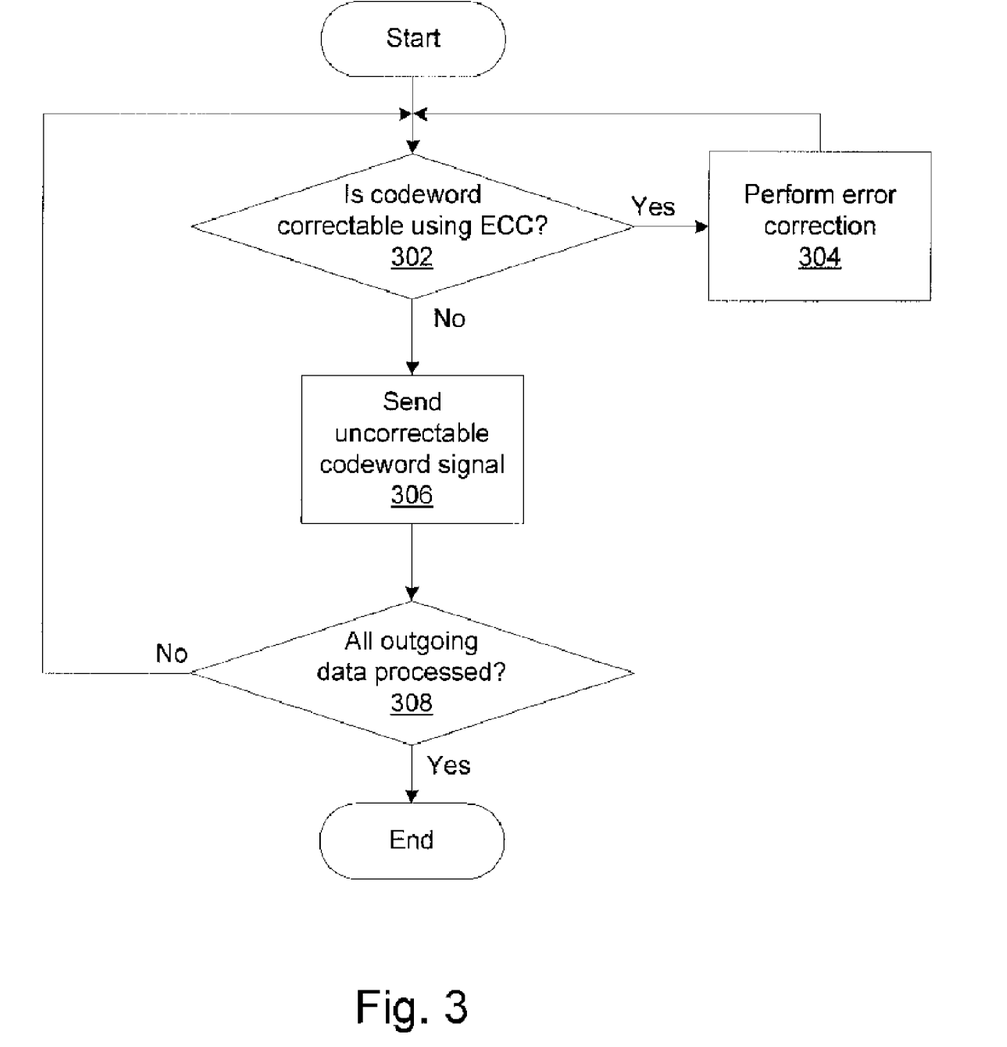
FIG. 3 is a flow diagram illustrating the generation of an uncorrectable codeword signal according to some embodiments.

FIG. 3 is a flow diagram illustrating the generation of an uncorrectable codeword signal according to some embodiments. When a read command is issued by a processor or memory controller, one or more codewords may be read from an array of memory cells. For each codeword read from the array, an ECC engine determines whether the codeword is correctable using ECC (Block 302). If the codeword is correctable, error correction will be performed on the codeword (Block 304). If the codeword is not correctable, that is, if it contains greater than the number of errors, t, that can be corrected by the ECC scheme, an uncorrectable codeword signal is sent to a bit error rate monitor (Block 306). The process is repeated for all codewords that are read from the memory array (Block 308). The uncorrectable codeword signal may subsequently be used by a bit error rate monitor to determine a bit error rate.

Figure 4:
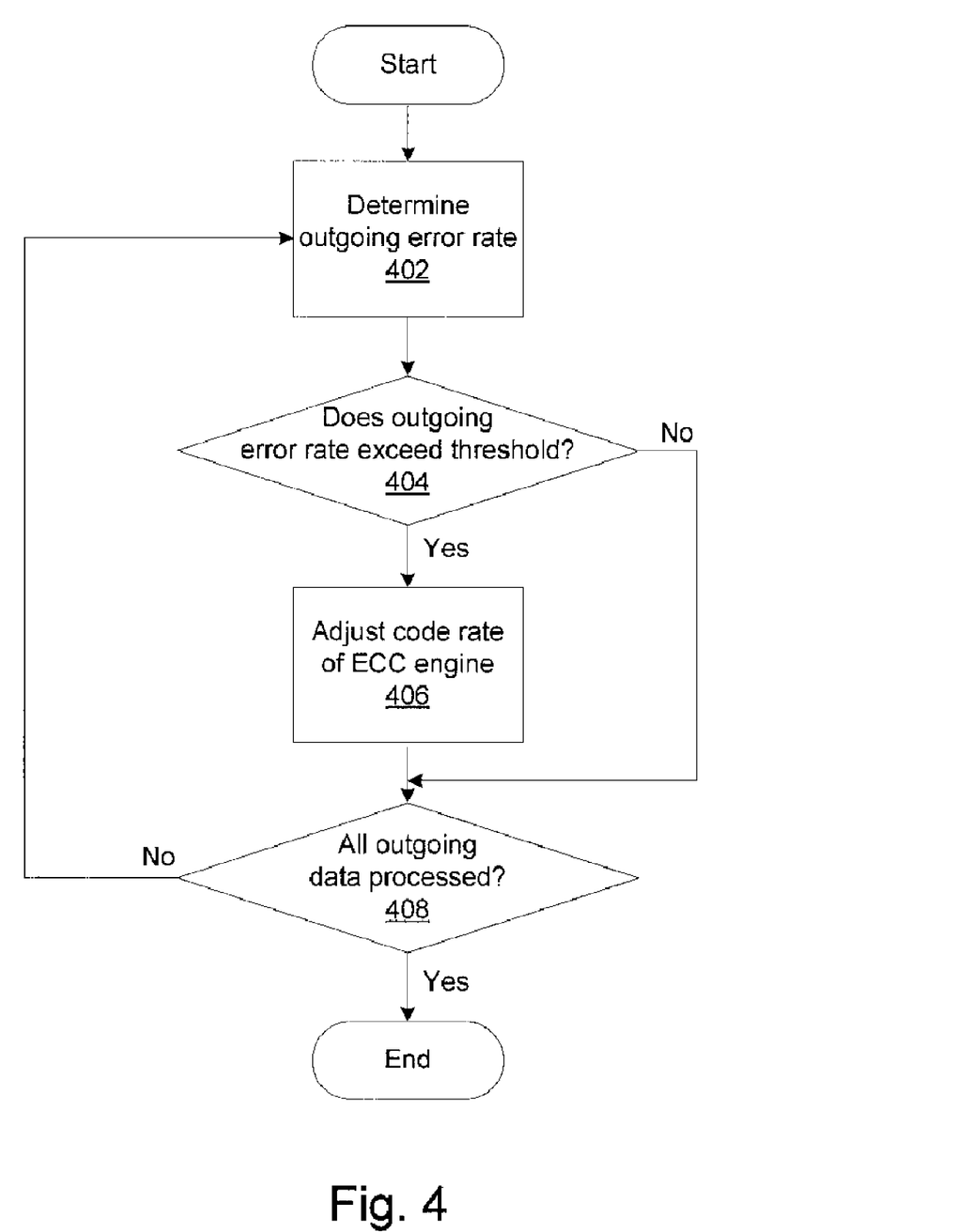
FIG. 4 is a flow diagram illustrating adjustment of a code rate according to some embodiments.

FIG. 4 is a flow diagram illustrating adjustment of a code rate using an outgoing error rate according to some embodiments. An outgoing error rate is determined based on at least one or more received uncorrectable codeword signals (Block 402). In some embodiments, the outgoing error rate may be calculated by a bit error rate monitor in the manner set forth above with respect to FIG. 1. If the outgoing error rate exceeds a predetermined threshold value or deviates from a desired rate by a predetermined value (Block 404), the code rate of the ECC engine is adjusted (Block 406). In some embodiments, the code rate of the ECC engine may be adjusted up or down by sending a code rate change signal to the ECC engine. If the outgoing error rate does not exceed a threshold value or does not deviate from a desired rate, the code rate of the ECC engine is not modified. In this case, no signal may be sent to the ECC engine. The outgoing error rate will continue to be calculated and the bit error rate adjusted accordingly until all outgoing data is processed (Block 408).

Figure 5:
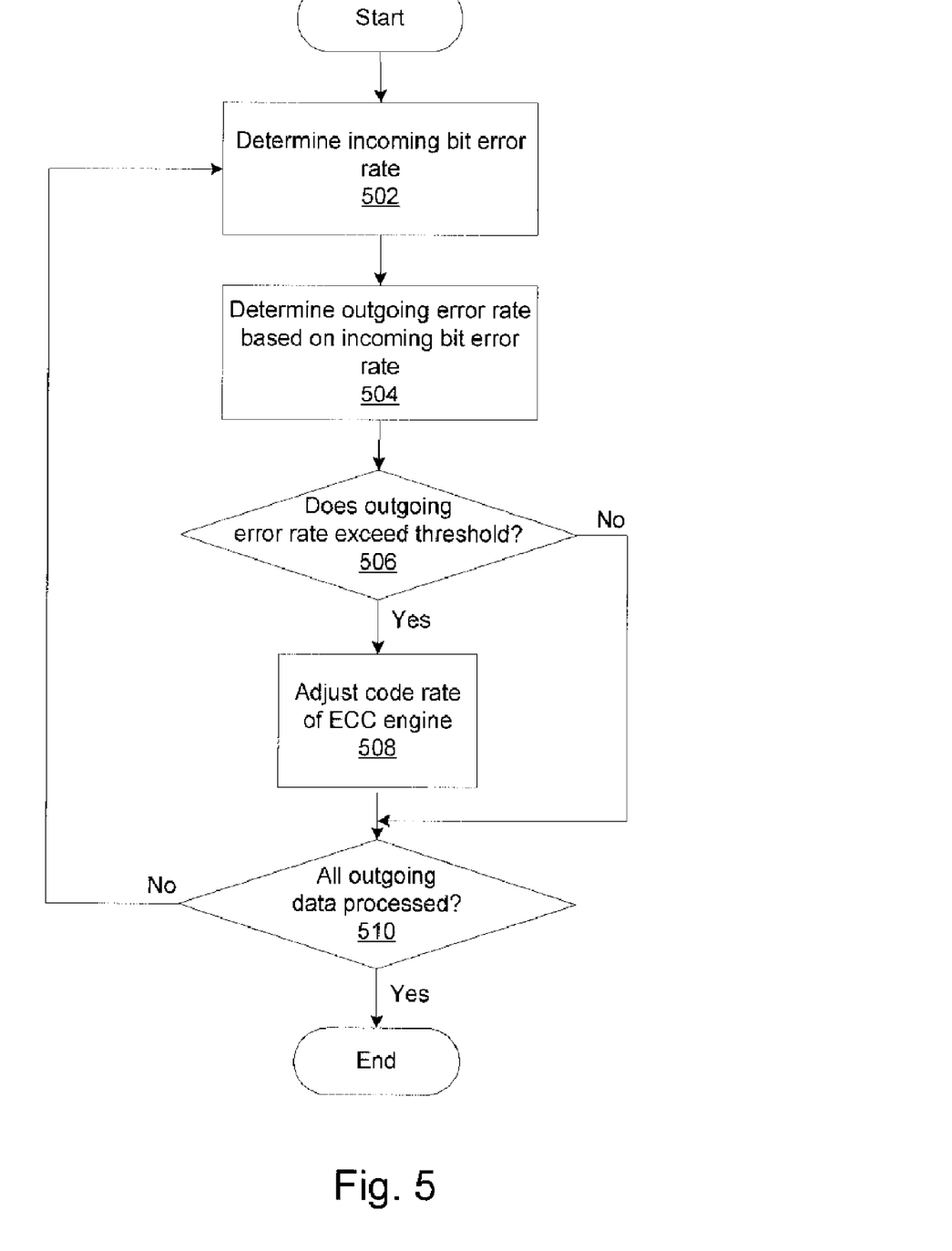
FIG. 5 is a flow diagram illustrating adjustment of a code rate according to some embodiments.

FIG. 5 is a flow diagram illustrating adjustment of a code rate using an incoming bit error rate according to some embodiments. An incoming bit error rate is determined based on at least a number of bits corrected in each codeword (Block 502). In some embodiments, the incoming bit error rate may be calculated by a bit error rate monitor block in the manner set forth above with respect to FIG. 1. An outgoing error rate may then be determined based on the incoming bit error rate (Block 504). In some embodiments, the outgoing error rate may be estimated based on a binomial distribution for bit error rate. In other embodiments, the outgoing error rate may be mapped to incoming bit error rate using a look-up table. If the determined outgoing error rate exceeds a predetermined threshold value or deviates from a desired rate by a predetermined value (Block 506), the code rate of the ECC engine is adjusted (Block 508). In some embodiments, the code rate of the ECC engine may be adjusted up or down by sending a code rate change signal to the ECC engine. If the outgoing error rate does not exceed a threshold value or does not deviate from a desired rate, the code rate of the ECC engine is not modified. In this case, no signal may be sent to the ECC engine. The outgoing error rate will continue to be calculated and the bit error rate adjusted accordingly until all outgoing data is processed (Block 510).

In another embodiment (not illustrated), adjustment of the code rate of the ECC engine may be based solely on the incoming bit error rate. In this case, determination of the outgoing error rate may not be necessary.

Figure 6:
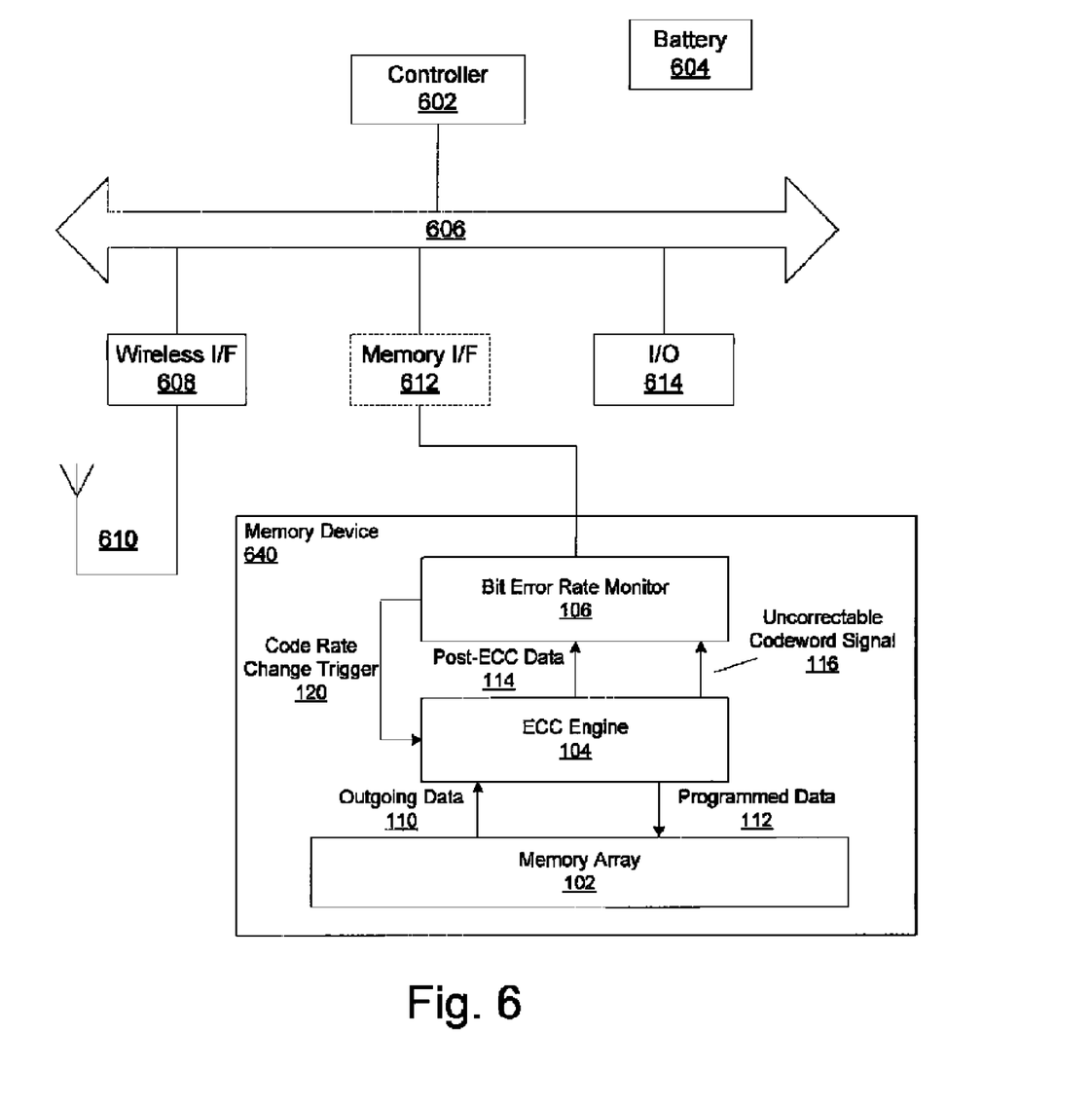
FIG. 6 is an illustration of a system according to some embodiments.

FIG. 6 is a block diagram of a system according to one embodiment. In some embodiments, the system may be a mobile wireless device.

The system may include a controller (602) which communicates via an interconnect (606). The controller (602) may be a microcontroller, one or more microprocessors, each of which may include one or more cores, a digital signal processor (DSP), or another type of controller. The system may be powered by a battery (604) or may be powered with another power source, such as AC power.

A variety of input/output (I/O) devices (614) may be coupled to the interconnect (606). The I/O devices may include items such as a display, keyboard, mouse, touch screen, or other I/O devices. A wireless network interface (608) including an antenna (610) may also be coupled to the interconnect (606). The wireless interface (608) may enable cellular or other wireless communication between the system and other devices. In one embodiment, the antenna (610) may be a dipole antenna.

The system also includes a non-volatile memory device (640) capable of supporting ECC, such as, but not limited to, a NAND flash memory device. The memory device may be built into the system, or may be part of a removable storage medium, such as a card form factor, that may be inserted into an optional flash card interface (612) or other type of interface.

The memory device (640) may include the blocks described above with respect to FIG. 1, including a memory array (102), an ECC engine (104) coupled to the array, and a bit error rate monitor (106) coupled to the ECC engine. The memory device (640) may include other elements as well, however, those components are not illustrated here for ease of understanding.

In some embodiments, the ECC engine (104) and bit error rate monitor (106) may be separate from the memory device, for example, in a memory controller device that is coupled to the memory device (640) in the system.

The ECC engine (104) may compute parity data and form codewords for data that is to be programmed to the memory array (112). When outgoing data is read from the memory array (110), the ECC engine may perform error correction. The ECC corrected data (114) may be sent to the bit error rate monitor (106). If the ECC engine cannot correct a codeword, an uncorrectable codeword signal (116) is sent to the bit error rate monitor (106).

As described above with respect to FIG. 1, the bit error rate monitor (106) dynamically determines a bit error rate based at least in part on the uncorrectable codeword signals received from the ECC engine (104). Based on the bit error rate, a code rate change trigger may be sent to the ECC engine (104) to indicate that the code rate should be increased or decreased in order to maintain an outgoing error rate that is within a predetermined desired range.

Thus, a method, apparatus, and system for dynamic adjustment of a code rate are disclosed in various embodiments. In the above description, numerous specific details are set forth. However, it is understood that embodiments may be practiced without these specific details. In other instances, well-known circuits, structures, and techniques have not been shown in detail in order not to obscure the understanding of this description. Embodiments have been described with reference to specific exemplary embodiments thereof. It will, however, be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

We claim:

1. An apparatus, comprising:
   a memory array;
   an Error Control Coding (ECC) engine coupled to the memory array; and
   a bit error monitor coupled to the ECC engine, wherein the ECC engine is to provide a signal to the bit error monitor for an uncorrectable codeword, and wherein the bit error monitor is to trigger a code rate change for the ECC engine based on a bit error rate.

2. The apparatus of claim 1, wherein the ECC engine is further to correct bit errors in correctable codewords, to determine a number of bits corrected in each correctable codeword, and to provide the number of bits corrected in each correctable codeword to the bit error monitor.

3. The apparatus of claim 1, wherein the bit error rate is an outgoing error rate.

4. The apparatus of claim 1, wherein the bit error rate is an incoming bit error rate.

5. The apparatus of claim 1, wherein the memory array, the ECC engine, and the bit error monitor are part of a memory device.

6. The apparatus of claim 1, wherein the memory device is a NAND flash memory device.

7. The apparatus of claim 1, wherein the ECC engine and the bit error monitor are part of a memory controller device and wherein the memory array is part of a flash memory device.

8. A system comprising:
   an interconnect;
   a controller coupled to the interconnect;
   a wireless interface coupled to the interconnect; and
   a memory device coupled to the interconnect, wherein the memory device includes a memory array, an Error Control Coding (ECC) engine coupled to the memory array, and a bit error monitor coupled to the ECC engine, wherein the ECC engine is to provide a signal to the bit error monitor for an uncorrectable codeword, and wherein the bit error monitor is to trigger a code rate change for the ECC engine based on a bit error rate.

9. The system of claim 8, wherein the memory device is a NAND flash memory device.

10. The system of claim 9, wherein the memory array is comprised of a plurality of memory cells, each memory cell capable of storing at least two bits per cell.

11. The system of claim 8, wherein the bit error rate is an outgoing error rate.

12. A method, comprising:
    determining whether a codeword read from a memory array is correctable using error control coding (ECC) at a first code rate, and if so, performing error correction;
    if the codeword is not correctable, providing an uncorrectable codeword signal;
    using the uncorrectable codeword signal to determine an outgoing error rate; and
    if the outgoing error rate exceeds a predetermined threshold, changing the first code rate to a second code rate by computer.

13. The method of claim 12, further comprising reading a plurality of codewords encoded at the first code rate out of the memory array, encoding the plurality of codewords using the second code rate, and writing the plurality of codewords encoded at the second code rate back to the memory array.

14. The method of claim 12, wherein the memory array is an array of NAND flash memory cells.

* * * * *

UNITED STATES PATENT AND TRADEMARK OFFICE
CERTIFICATE OF CORRECTION

| | |
|---|---|
| PATENT NO. | : 8,122,323 B2 |
| APPLICATION NO. | : 11/683631 |
| DATED | : February 21, 2012 |
| INVENTOR(S) | : Peter Leung et al. |

It is certified that error appears in the above-identified patent and that said Letters Patent is hereby corrected as shown below:

Column 8, line 5: "hit" should be --bit--

Signed and Sealed this
Seventeenth Day of April, 2012

David J. Kappos
*Director of the United States Patent and Trademark Office*